United States Patent [19]

Cruson

[11] 4,072,258

[45] Feb. 7, 1978

[54] RETRACTABLE UNITARY COMPACT SPARE TIRE CARRIER ASSEMBLY FOR UNDERBODY MOUNTING TO A PICKUP TRUCK OR THE LIKE

[76] Inventor: Doyle D. Cruson, 10713 Hawn Freeway, Dallas, Tex. 75217

[21] Appl. No.: 668,997

[22] Filed: Mar. 22, 1976

[51] Int. Cl.² .............................................. B62D 43/04
[52] U.S. Cl. ........................ 224/42.21; 214/DIG. 10; 214/451; 224/42.23
[58] Field of Search ............... 224/42.12, 42.21, 42.23, 224/42.24, 42.25, 42.28, 42.29, 42.43, 42.44, 42.46 R, 42.41; 296/37.2; 214/451, 452, 453, 454, DIG. 10; 280/163, 164 R, 152.05; 254/10 R, 10 B, 10 C, 126

[56] References Cited

U.S. PATENT DOCUMENTS

| 1,751,480 | 3/1930 | Howell | 254/10 R X |
|---|---|---|---|
| 2,028,945 | 1/1936 | Morrison | 214/451 |
| 2,587,067 | 2/1952 | Sachtleber | 254/10 C X |
| 3,488,066 | 1/1970 | Hansen | 280/163 |

FOREIGN PATENT DOCUMENTS

| 1,494,180 | 7/1966 | France | 296/37.2 |
|---|---|---|---|
| 1,014,447 | 8/1957 | Germany | 214/451 |
| 1,082,067 | 9/1967 | United Kingdom | 254/126 |

*Primary Examiner*—Robert J. Spar
*Assistant Examiner*—Winston H. Douglas
*Attorney, Agent, or Firm*—Sughrue, Rothwell, Mion, Zinn and Macpeak

[57] ABSTRACT

An inverted U-shaped mounting bracket is bolted to the bottom of one pickup truck U-frame member at the rear of the truck and an inverted L-shaped mounting bracket is bolted to the bottom of the other truck U-frame member in laterally opposed position, pairs of forward and rear hanger arms are each pivoted at one end to said respective brackets and at their lower ends to the sides of a spare tire carrier rack to form a parallelogram arrangement for supporting a spare tire horizontally beneath the rear of the truck. A compact screw drive mechanism has its forward end respectively mounted to an extended outer wall of said inverted U-shaped mounting bracket and its rear end mounted to the same wall in the area of the pivot connections for the hanger arms to the U-shaped mounting bracket, and carries a screw rotatable about its axis and extending longitudinally along the U-shaped bracket which, in turn, carries a nut restrained from rotation but movable along the screw axis during screw rotation. A drive lever is pivoted at one end to the nut and at the other end to the adjacent rear hanger arm to cause the rack and the spare tire carried between the pairs of hanger arms and upon the rack to swing forwardly and upwardly in close proximity to the underbody of the truck, and vice versa.

2 Claims, 7 Drawing Figures

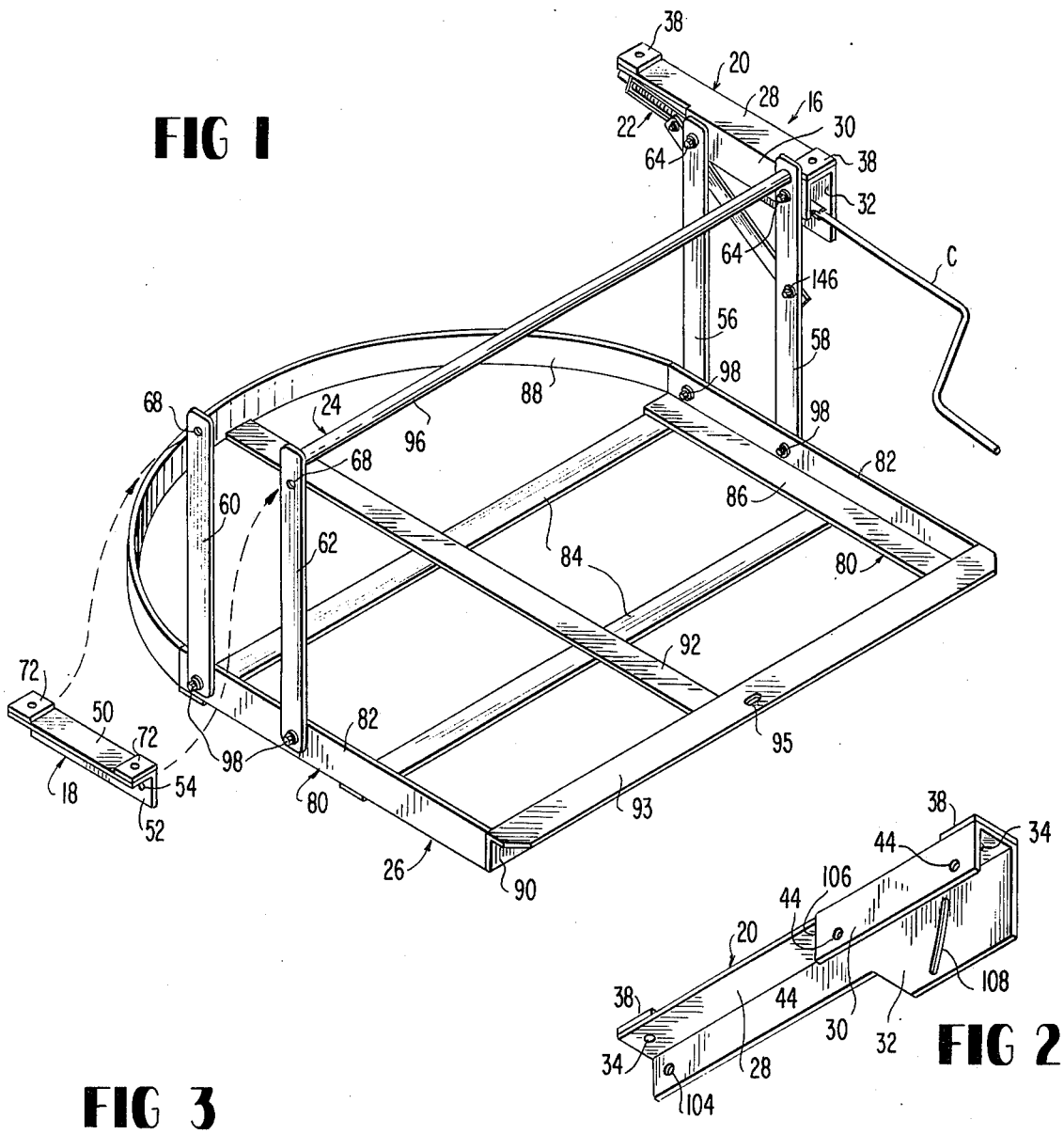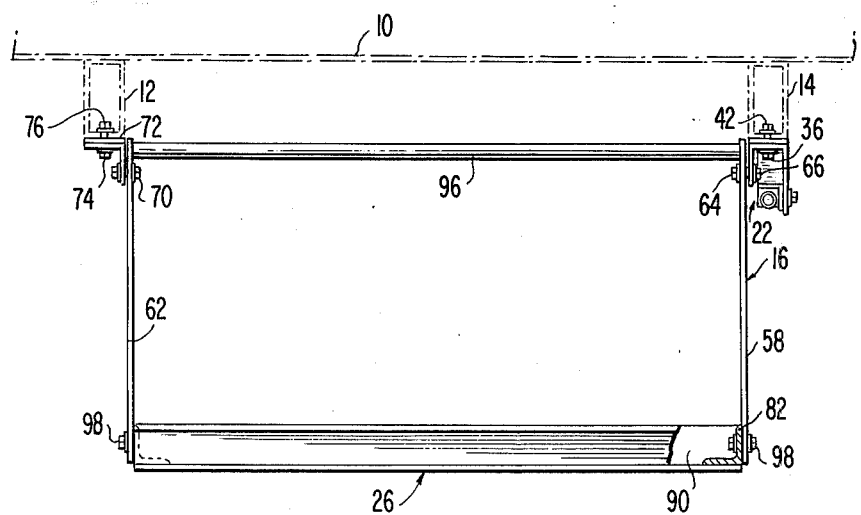

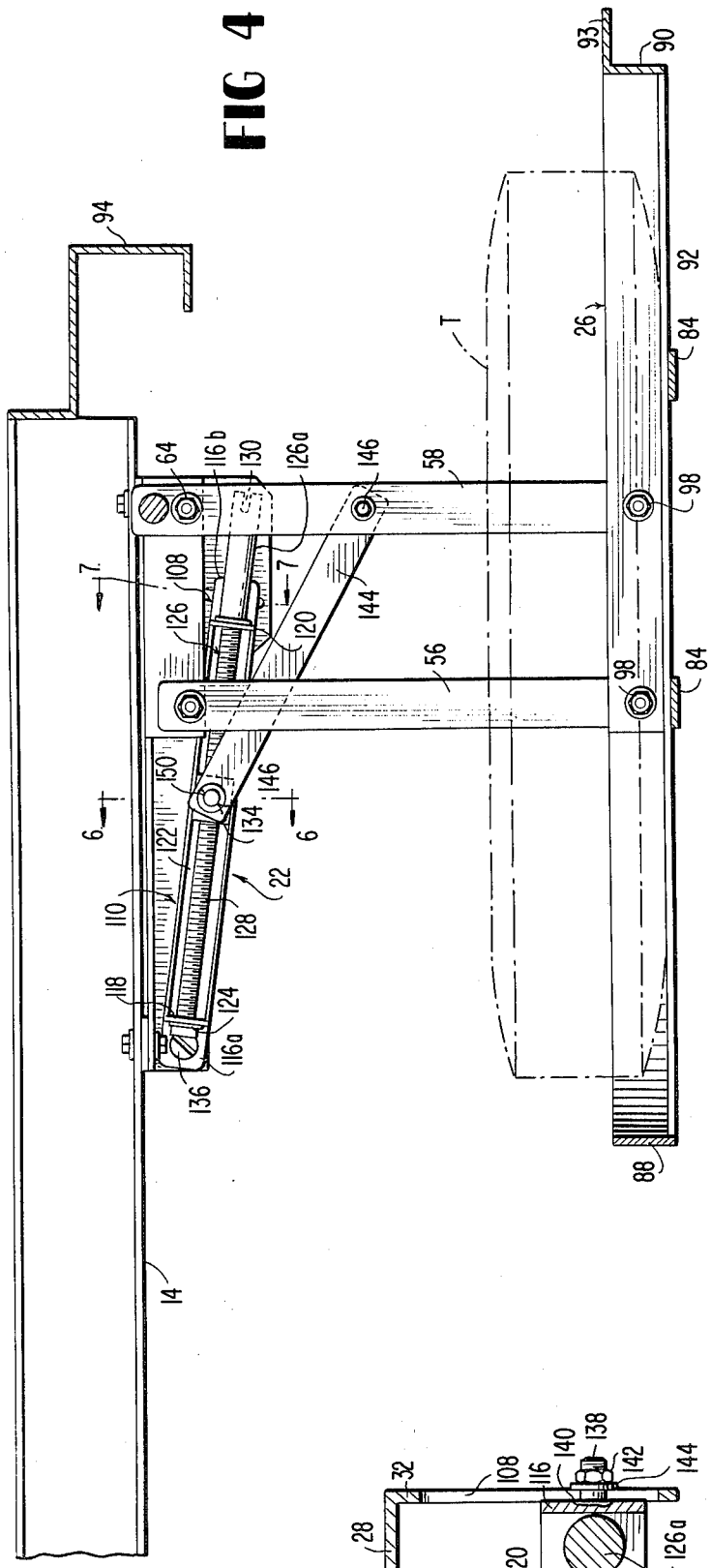

RETRACTABLE UNITARY COMPACT SPARE TIRE CARRIER ASSEMBLY FOR UNDERBODY MOUNTING TO A PICKUP TRUCK OR THE LIKE

BACKGROUND OF THE INVENTION

1. Field of the Invention

This invention relates to spare tire carrier racks and more particularly to a simplified, compact rack incorporating an integral screw lift mechanism which may be readily mounted in underbody position to a variety of automotive vehicles such as pickup trucks and the like.

2. Description of the Prior Art

In an attempt to dispose a spare tire in a hidden but accessible position on a pickup truck, station wagon or like automotive vehicle, without materially affecting the cargo or passenger carrying capability of the vehicle, a number of spare tire carrier racks have been employed in conjunction with mounting means for mounting the racks to the vehicle chassis such that the rack and the spare tire occupies an underbody position during normal vehicle use, while permitting access to the tire by effecting movement of the rack rearwardly to partially or fully expose the spare tire to personnel standing behing the vehicle.

U.S. Pat. Nos. 1,664,856 to Green and 3,554,415 to Woods disclose spare tire carrier racks which are mounted for sliding movement horizontally on laterally spaced chassis frame members into a retracted position where the tire underlies the floor or bed of the truck body to which the carrier rack is mounted, and during the need for changing tires, the rack is extracted from beneath the vehicle underbody to expose the horizontally positioned tire for direct access and removal. Such devices are not only complicated in design but quite costly, and the spare tire carrier rack must of necessity be supported at a position spaced some distance below the frame member of the pickup truck or like vehicle to permit sliding projection and retraction of the tire carrier rack and the spare tire without contact of the same with portions of the vehicle underbody.

Attempts have been made to mount a spare tire in underbody position at the rear of an automotive vehicle or the like by means of pairs of forward and rear hanger arms pivotably mounted at their upper ends to respective sides of the chassis frame and at their lower ends to the spare tire carrier in which case the tire and its carrier simply swing from a rear projected and lowered position to a forward and raised position in close proximity to the vehicle underbody.

U.S. Pat. Nos. 3,187,914 to Peras is indicative of such an approach. In order to effect positive movement of the carrier between the rearwardly projecting and lowered position of the carrier and a raised and forwardly projecting position, a rack and pinion gear system has been employed. Such a system is shown in U.S. Pat. No. 2,028,945 to Morrison.

It is, therefore, an object of the present invention to provide an improved compact spare tire carrier rack assembly for universal mounting to various sized automotive vehicles and in particular pickup trucks and the like which employ a simplified parallelogram support for the spare tire carrier rack and incorporate within that mount, a compact screw lift mechanism carried by the assembly on one of the laterally opposed mounting brackets which directly mounts the spare carrier rack assembly to the bottom of the vehicle frame member, shields the screw lift mechanism from excessive road dirt, which permits the screw lift mechanism to be adjustably positioned to insure direct access to the rotary screw by a conventional crank handle without the necessity of drilling holes within the bumper of the vehicle and which permits the spare tire carrier rack to maintain the spare tire horizontally and in close proximity to the vehicle underbody.

SUMMARY OF THE INVENTION

The spare tire carrier assembly of the present invention comprises laterally opposed brackets respectively mounted to laterally opposed truck frame chassis frame members on respective sides of the truck at the rear thereof. One of said brackets is of inverted U-shape including inner and outer vertical sidewalls, the other bracket is of inverted L-shape including one corresponding vertical wall. An open frame flat tire carrier rack includes laterally spaced upstanding sidewalls at positions underlying vertical walls of respective brackets. Pairs of equal length forward and rear hanger arms are pivoted at one end to a respective bracket vertical wall at longitudinally spaced positions and to the carrier rack sidewalls to support the carrier rack in horizontal position and to form a parallelogram support for the carrier rack. A screw drive mechanism is mounted to one of said brackets and supports a screw for rotation about its axis which extends longitudinally of the bracket parallel to a carrier rack sidewall. A nut is threadably mounted on said screw and a guide member is provided for preventing rotation of the nut such that as the screw rotates, the nut moves along the screw axis. A drive lever is pivoted at one end to said nut and at its other end to one of the hanger arms intermediate of the pivot points of the hanger arm, whereby rotation of the screw in one direction causes the carrier rack and the spare tire to be lifted vertically and retracted underneath the vehicle chassis and in the other direction to lower the carrier rack and the spare tire and to partially extend the rack and the spare tire rearwardly from beneath the vehicle body while maintaining the carrier rack horizontal during such movement.

The inverted U-shaped bracket to which the screw mechanism is mounted has its outer vertical wall extending forwardly beyond the inner vertical wall, the hanger arms are pivoted adjacent their upper ends at respective ends of the shorter length inner vertical wall, said screw is rotatably mounted within an elongated C-shaped nut guide member, with the ends of the guide member being mounted to the outer vertical wall on respective sides of the forward hanger arm, said nut is cubic in form and restrained on three faces by contact with said C-shaped guide member. The driver lever is pivotably coupled at one end to the exposed inside face of said nut and at the other end to the rear hanger arm longitudinally beyond the end of said guide member. The C-shaped guide member may be pivotably mounted at its forward end to the outer vertical wall of said inverted U-shaped bracket and the rear of said outer vertical wall carries an arcuate slot whose radius of curvature coincides with the forward pivot axis of said guide member. A threaded bolt is fixed to said guide member at its rear and extends through said slot and a nut is threaded to said bolt to lock the rear end of said guide member to said outer sidewall but permits the axis of said screw to be adjusted such that a line extending coaxial therewith passes beneath the vehicle rear bumper to permit direct unimpeded coupling of the rear end of the screw with a hand crank for turning of the screw to shift said spare tire carrier rack.

BRIEF DESCRIPTION OF THE DRAWINGS

FIG. 1 is a partially exploded, perspective view of the spare tire carrier assembly of the present invention with the crank handle in place.

FIG. 2 is an enlarged perspective view of the right side bracket of the assembly of FIG. 1.

FIG. 3 is a rear end view of the spare tire carrier assembly of FIG. 1 mounted to the underbody of an automotive pickup truck.

FIG. 4 is a sectional elevation of a portion of the assembly of FIG. 1 with the rack assembly lowered and extended rearwardly.

FIG. 5 is a similar sectional view with the space tire carrier rack in raised, retracted position.

FIG. 6 is a sectional elevation of a portion of the assembly of FIG. 4 taken about line 6—6.

FIG. 7 is a sectional elevation of a portion of the assembly of FIG. 4 taken about line 7—7.

DESCRIPTION OF THE PREFERRED EMBODIMENT

The retractable screw operated spare tire carrier assembly of the present invention has particular application to the automotive vehicle field, especially pickup trucks and the embodiment is illustrated as being mounted to the rear underbody of a pickup truck, the pickup truck being indicated in dotted lines in FIG. 2 as comprising a truck bed 10 supported on a pair of laterally spaced chassis frame members 12 and 14 at the left and right sides of the truck, the chassis frame members 12 and 14 being hollow elongated metal tubes and are square in cross section and formed of steel or the like.

The unitary, compact spare tire carrier assembly of the present invention which is identified generally at 16 in FIG. 1, comprises a number of main components, the L-shaped left side mounting bracket 18, the right side mounting bracket 20, the screw lift mechanism 22, the parallelogram pivot support assembly 24, and the open frame spare tire carrier rack indicated generally at 26. The right side mounting bracket 20 comprises a sheet metal member bent into inverted U-shaped configuration, FIG. 2, and consisting essentially of a horizontal base 28, an inner vertical sidewall 30 and an outer vertical sidewall 32. The inner sidewall 30 is of given length and is much shorter than the outer sidewall 32, so as to expose the area beneath the base 28 and a portion beyond the outer sidewall 32 at the forward end of the mounting bracket. Further, the right side mounting bracket 20 is provided with longitudinally spaced holes 34 within the base through which bolts 36 pass, the bolts extending through a vibration absorbing pad 38 and through holes within the chassis frame 14 with nuts 42 threaded to the projecting ends of the bolts 36 and locking the right side bracket 20 to the right side chassis frame member 14 at fore and aft positions defined by holes 34.

The inner vertical sidewall 30 of bracket 20 is also provided with holes as at 44 at positions adjacent respective ends of that sidewall. On the opposite side of the vehicle, the inverted L-shaped left side bracket 18 is formed with a horizontal base 50 and a right angle vertical integral sidewall 52. Both brackets 18 and 20 are formed of bent sheet steel or the like. Longitudinally spaced holes 54 are formed within the sidewall 52 of the left side bracket 18 at positions corresponding to those of holes 44 within the inner sidewall 30 of the right side bracket 20. Parallelogram support assembly 24 pivotably supports the open frame tire carrier rack 26, and takes the form of laterally spaced pairs of generally equal length hanger arms. In this respect, there is provided a forward hanger arm 56 and a rear hanger arm 58 for the right side bracket 20 and a forward hanger arm 60 and a rear hanger arm 62 of similar size for left side bracket 18. The upper ends of bracket arms 56 and 58 are pivotably mounted to the inner sidewall 30 of the left side bracket 18 by means of bolts 64 which extend through holes (not shown) within the hanger arms 56 and 58 and through holes 44 of the inner sidewall 30 of the right side bracket 20, therse bolts threadably carrying nuts 66, FIG. 3. The lower ends of all four hanger arms 56, 58, 60 and 62 are pivotably bolted to the vertical sidewalls 82 of rack 26 by bolts 96, 98. The tire C centers itself essentially between the forward and rear pairs of hanger arms of respective pairs to balance the load on the parallelogram support assembly 24. The upper ends of the hanger arms 60 and 62 carry holes 68 which match with holes 54 in the left side bracket 18 with a nut and bolt pivot connection being formed as at 70, FIG. 3, for pivotably fixing the upper ends of the hanger arms 60 and 62 to the left side bracket 18. In turn, the left side bracket is provided with vibration absorbing pads 72 on the base 50 and nut and left side bracket 18 is bolted to the left side chassis frame member 12 by bolts 74 upon which are threaded the nuts 76. The holes within the left chassis frame member 12 permit the left side bracket to be fixed to the chassis frame member 12 at longitudinally spaced positions to form a rigid mount for the parallelogram support assembly 24. The longitudinally spaced holes such as hole 54 within the left side bracket 18 vertical sidewall 52 are at spaced positions equal to those of holse 44 within the inner sidewall of the right side bracket 20, so that the front and rear hanger arms 60 and 62 correspond in longitudinal position to hanger arms 56 and 58 on the opposite side of the vehicle.

Open frame tire carrier rack 26 is formed of sheet metal strip stock such as steel strips or the like, being welded together and is comprised of laterally spaced L bars 80 forming the opposed vertical sidewalls 82, across which extend a pair of cross bars 84 being welded at their ends to the bases 86 of respective L bars 80. A curved end wall 88 formed of a curved strip of metal constitutes an extension of the sidewalls 82 of the rack 26 and an inverted L bar 90 is welded at its corners to L bars 80 to close off the rack. A center strip 92 extends longitudinally at the center line of the rack and is welded at respective ends to the curves strip 88 and to the inverted L bar 90. The horizontal base 93 of the L bar 90 includes an elongated slot 95 running longitudinally of that bar and being positioned at the center so as to permit a lock (not shown) to pass therethrough and through a hasp (not shown) to lock the tire carrier rack to a rear bumper 94, FIG. 4, when the tire carrier rack 26 is in retracted, raised position. For maximum stability to the parallelogram support assembly, the ends of the pair of rear hanger arms 58 and 62 may be extended vertically slightly beyond the pivot axis as defined by bolts 64 and 70 and a cylindrical rod 96 is preferably welded at respective ends to the inside faces of these hanger arms.

In this manner, the open frame tire carrier rack is in a position to receive the spare tire T, indicated in dotted form in FIG. 4 centered within the rack and with the curvature of the tire conforming to that curvature of the forward wall 88 of rack 26. During movement from fully retracted or fully extended positions or vice versa, the spare tire and the carrier rack remain horizontal, supported and balanced by the multiple pairs of hanger arms.

A principal aspect of the present invention is the employment of the compact and integrated screw lift mechanism 22 with the parallelogram supported tire carrier rack 26, this screw lift mechanism 22 being incorporated within and attached to the inverted U-shaped right side mounting bracket 20. As seen in FIG. 2, the outer vertical sidewall 32 of that bracket carries a hole 104 at its forward end well beyond the forward edge 106 of the inner sidewall 30. Further, the outer vertical sidewall 32 carries an arcuate elongated slot 108 which has a radius of curvature conforming to hole 104. The screw lift mechanism 22 comprises an open wall C-shaped guide member 110, FIGS. 4, 5 and 6 including an upper wall 112, a lower wall 114, and a sidewall or base 116. The sidewall 116 is extended at its forward end as at 116a and extended at its rear end as at 116e, beyond walls 112 and 114. Further, extending outwardly beyond the sidewall 116 at its forward end, is a forward end plate 118 which is of rectangular form, to the extent of the width of the upper and lower walls 114 and closing off the rectangular cavity 122 formed thereby at the forward end of this member. In similar fashion, a second rear end plate 120 is fixed to the sidewall 116 and extends outwardly therefrom at right angles to the extend of the width of walls 112 and 114 and closes off the rear end of the rectangular cavity 122 formed by the guide member. Bearings 124 rotatably support a threaded drive shaft indicated generally at 126 having a threaded portion or screw 128 extending along the major length of the same between plates 118 and 120. The unthreaded rear end 126a of the shaft terminates in a transverse slot 130 which axially penetrates the end face of that shaft. Threaded to the shaft 126 intermediate of the plates 118 and 124 is a cubic nut 134 having dimensions matching the upper and lower walls 114 and sidewall 116 of the guide member such that the nut 134 is restrained and prevented from rotation when shaft 126 is rotated about its axis on bearings 124. By restraining or preventing rotation of the nut, the nut 134 must translate along the shaft axis as the screw 128 or threaded portion 126 of the shaft rotates. That portion of the shaft in forming an elongated screw causes the nut to move longiturdinally relative to the vehicle in response to rotation of the shaft. The guide member 110 has sidewall 116 mounted to the outer sidewall 32 of the inverted U-shaped right side bracket 20.

In fact, an important aspesct of the present invention is the nature in which that guide member and principal component of the screw lift mechanism can be angularly adjusted relative to the right side bracket 20. In that regard, the forward end 116a of the guide member sidewall 116 is pivotably mounted to the outer sidewall 32 by bolt 136. The bolt 136 passes through a hole formed within the forward end 116a of sidewall 116 and passes through hole 104 within the outer sidewall of the right side bracket 20. Further, as seen in FIG. 7, a bolt 138 is welded as at 140 to the outside face of the sidewall 116 of the guide member 110, extends through the elongated arcuate slot 108 within the outer sidewall 32 of the right side bracket 20 and a nut 142 is threaded to the projecting end of the same with a washer 144 pressed against the vertical sidewall 32 of bracket 20 to frictionally lock the rear end of the screw lift mechanism at a predetermined angular position relative to the vehicle frame member 14. By simply loosening nut 142, the angle of inclination of the guide member 110 relative to the horizontal may be changed to insure that the slotted end 130 of shaft 126 is freely accessible to a hand crank C which effects rotation of shaft 126 and translation of the nut 134 within guide member 110, FIG. 1.

As seen in FIG. 4, due to the presence of the rear bumper 94 (or in fact other portions of the vehicle or attachments to the same), it may be necessary to shift the axis of shaft 126 to permit direct coupling of the crank C to the shaft 126 without impediment. This may be done without the necessity of drilling holes or cutting away portions of the rear bumper 94, by simply increasing the angle between the screw lift mechanism 22 and bracket base 28.

As a further aspect of the compact screw lift mechanism and open frame tire carrier assembly of the present invention, extension and retraction and lowering and lifting of the tire carrier rack 26 is readily achieved by the use of a short drive link or lever 144. Lever 144 is pivotably coupled at one end to the rear hanger arm 58 associated with the right side bracket 20. This is achieved by a nut and bolt connection 146; the hanger arm 58 being provided with a hole intermediate holes through which bolts 64 and 98 pass. The forward end of the drive lever or link 144 is provided with a hole which as seen in FIG. 6 receives a small diameter projection portion 146 of the nut 134. Washers 148 are mounted to the cylindrical projection portion 146 on each side of the lever 144, and the washer and the lever arm are prevented from coming off projection 146 by the presence of cotter pin 150 which passes through a hole drilled through and at right angles to the axis of the projection 146 adjacent the outer end of the same. The nut 134 may be formed of steel or may be formed of a low friction plastic material such as Nylon capable of absorbing stress during transmission of the rotation of shaft 126 to the lever 144 to effect linear movement thereof. The make up of the screw lift mechanism 22, the length of the threaded portion or screw 128 of shaft 126, the length of lever 144 and its point of pivot connection by way of bolt 146 to the rear hanger arm 58 (or to the forward hanger arm 56 if desired) is achieved with the thought in mind that the function of the spare tire carrier rack is to store the spare tire in a total underbody position, that is, in a position such that the rack and the tire are retracted beneath the vehicle body with the tire lifted as close as possible to the underbelly of the vehicle bed 10. The mounting of the guide member 110 and the rotatable shaft 126 between the vertical sidewalls 30 and 32 of the right side bracket, further confined by base 28, limits the amount of dirt and crud to which the screw lift mechanism is subjected and protects that mechanism mechanically against possible damage during vehicle operation. The same is true for the rear portion 126a of shaft 126 which receives the end of the hand crank C, shaft 126 terminating short of the rear end of the right side bracket 20, thus being fully protected by that member. As stated previously, the use of the pivot axis for the guide member is defined by hole 104 and slot 108. Adjustably positioning the rear end 116b of the guide member sidewall 116 permits the screw mechanism to be maintained nested to the maximum extent within the inverted U-shaped right side bracket 20, while permitting the desired direct in line access to the interconnection slot 130 of shaft 126 by crank C.

While the invention has been particularly shown and described with reference to a preferred embodiment thereof, it will be understood by those skilled in the art that various changes in form and details may be made therein without departing from the spirit and scope of the invention.

What is claimed is:

1. A compact, retractable screw driven spare tire carrier assembly for underbody mounting to a pickup truck or the like, said truck having laterally opposed chassis frame members on respective sides thereof, said assembly comprising: first and second mounting brackets mounted to the underside of respective frame members in laterally opposed positions, said first bracket being of inverted U-shape including inner and outer vertical bracket sidewalls, said second bracket being of inverted L-shape and including a vertical bracket wall corresponding to one of said inner and outer vertical sidewalls of said inverted U-shaped bracket, a flat tire carrier rack comprising laterally spaced upstanding sidewalls at positions underlying vertical sidewalls of respective brackets, laterally opposed pairs of hanger arms, including generally equal length forward and rear hanger arms, each arm being pivoted at one end to a respective bracket vertical wall and to a corresponding carrier rack sidewall to maintain the carrier rack in horizontal position and to define a parallelogram support for said rack, a screw drive mechanism mounted to said first bracket between said inner and outer vertical bracket sidewalls, said first bracket having its outer vertical sidewall extending longitudinally forwardly beyond the inner vertical bracket sidewall, one pair of hanger arms being pivotally coupled at their upper ends respectively to said first bracket inner vertical sidewall at respective ends thereof, said screw drive mechanism comprising an elongated, C-shaped nut guide member, and elongated screw mounted for rotation about its axis within said C-shaped nut guide member with said C-shaped nut guide member having an open side facing away from the first bracket outer vertical sidewall, said screw comprising a threaded shaft rotably mounted at respective ends of said C-shaped guide member, a nut threadably mounted on said screw and being of cubic form and restrained on three faces by contact with right angle walls of said C-shaped guide member and to thereby prevent rotation of the nut and to cause said nut to translate along the screw axis as the screw rotates, an elongated drive lever pivotally coupled at one end to the exposed laterally inside face of said nut at the other end to the adjacent rear hanger arm longitudinally rearwardly beyond the end of said guide member and means for fixedly mounting the respective ends of the guide member to the first bracket outer vertical sidewall facing said first bracket inner sidewall at respective locations both forwardly and rearwardly of the adjacent forward hanger arm such that said inverted U-shaped first bracket shields said screw mechanism from excessive amounts of dirt and crud and protects that mechanism mechanically against damage during vehicle operation, whereby the rotation of the screw in one direction causes the carrier rack and spare tire to be lifted vertically and retracted beneath the vehicle chassis between the truck underbody and in the other direction to lower the carrier rack and the spare tire and to partially extend the rack and spare tire rearwardly, while maintaining the carrier rack and space tire horizontal during such movement.

2. The assembly as claimed in claim 1, wherein said outer vertical sidewall includes a hole at its forward end and an arcuate slot adjacent the rear end of the same, said arcuate slot has a radius of curvature coinciding with the hole within said external wall at its forward end, and said C-shaped guide member is bolted to the forward end of the outer vertical sidewall by bolt which passes through said hole, and said guide member includes a bolt at its opposite end which passes through said arcuate slot and said bolt carrier a threaded nut permitting said C-shaped guide member to be adjusted such that its angle of inclination relative to the base of said inverted U-shaped first bracket may permit direct and unimpeded coupling of that end of the screw shaft to a hand crank for turning of the screw to shift the position of said spare tire carrier rack and said spare tire carried thereby.

* * * * *

UNITED STATES PATENT OFFICE
CERTIFICATE OF CORRECTION

Patent No. 4,072,258  Dated Feb. 7, 1978

Inventor(s) Doyle D. Cruson

It is certified that error appears in the above-identified patent and that said Letters Patent are hereby corrected as shown below:

Column 1, line 25, delete "behing" and insert --- behind ---
Column 4, line 14, delete "therse" and insert --- these ---
 line 36, delete "holse" and insert --- holes ---
 line 52, delete "curves" and insert --- curved ---
Column 5, line 31, delete "extend" and insert --- extent ---
 line 49, delete "turdinally" and insert ----- tudinally ----

Column 7, line 43, delete "rotably" and insert --- rotatably ---
Column 8, line 24, delete "space" and insert --- spare ---

Signed and Sealed this

Twentieth Day of June 1978

[SEAL]

Attest:

RUTH C. MASON
*Attesting Officer*

DONALD W. BANNER
*Commissioner of Patents and Trademarks*